(12) United States Patent
Winter

(10) Patent No.: US 7,155,448 B2
(45) Date of Patent: Dec. 26, 2006

(54) METHOD AND APPARATUS FOR RECORDING DATA AND RECOVERING RECORDED DATA

(75) Inventor: Marco Winter, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 10/963,897

(22) Filed: Oct. 13, 2004

(65) Prior Publication Data

US 2005/0091280 A1    Apr. 28, 2005

(30) Foreign Application Priority Data

Oct. 23, 2003    (EP)    ................... 03024291

(51) Int. Cl.
G06F 17/30    (2006.01)
G06F 12/00    (2006.01)
H04N 5/85    (2006.01)

(52) U.S. Cl. .................... 707/101; 707/3; 707/10; 707/102; 707/103 R; 707/104.1; 711/4; 386/46; 386/125

(58) Field of Classification Search ................ 707/202, 707/3, 10, 101, 102, 103 R, 104.1; 711/4; 386/46, 52, 69, 125

See application file for complete search history.

(56) References Cited

U.S. PATENT DOCUMENTS

| | | | | |
|---|---|---|---|---|
| 5,655,117 | A * | 8/1997 | Goldberg et al. | ........... 707/102 |
| 5,765,164 | A * | 6/1998 | Prasad et al. | ........... 707/104.1 |
| 5,956,504 | A * | 9/1999 | Jagadish et al. | ........... 707/101 |
| 6,751,623 | B1 * | 6/2004 | Basso et al. | ................. 707/101 |
| 6,754,680 | B1 * | 6/2004 | Motomura et al. | ......... 707/202 |
| 6,792,047 | B1 * | 9/2004 | Bixby et al. | ........... 375/240.26 |
| 2001/0055467 | A1 | 12/2001 | Nakatani et al. | |
| 2002/0059276 | A1 * | 5/2002 | Wei et al. | .................... 707/100 |
| 2002/0062313 | A1 * | 5/2002 | Lee et al. | ........................ 707/3 |
| 2002/0164149 | A1 * | 11/2002 | Wilkinson | ..................... 386/46 |
| 2002/0165942 | A1 * | 11/2002 | Ulich et al. | .................. 709/219 |
| 2003/0086000 | A1 | 5/2003 | Siemens et al. | |
| 2004/0101281 | A1 * | 5/2004 | Defrance et al. | ............. 386/69 |
| 2004/0131340 | A1 * | 7/2004 | Antoun et al. | .............. 386/125 |
| 2004/0234237 | A1 * | 11/2004 | Hamada et al. | ................ 386/52 |
| 2005/0044105 | A1 * | 2/2005 | Terrell | ..................... 707/104.1 |
| 2005/0216443 | A1 * | 9/2005 | Morton et al. | .................. 707/3 |

FOREIGN PATENT DOCUMENTS

| | | |
|---|---|---|
| EP | 0971358 A2 | 1/2000 |
| EP | 0982947 A2 | 3/2000 |
| EP | 1102275 A2 | 5/2001 |

(Continued)

OTHER PUBLICATIONS

EPO Search Report.

*Primary Examiner*—Thuy N. Pardo
(74) *Attorney, Agent, or Firm*—Joseph J. Laks; Robert D. Shedd; Reitseng Lin

(57) ABSTRACT

The file system of a hard disk or optical disc may lose consistency when an unexpected event like a power failure occurs during recording. When recording a data stream, e.g. a video stream, an interruption would lead to a loss of stream data when previously known methods are used, because the file system is not updated. Further, the storage medium may become unusable. Dedicated file system data are put in regular intervals in user data fields of the data stream, providing the possibility to recover an interrupted stream recording. The method can also be used to recover data streams recorded on write-once discs, and it is independent from the used file system.

31 Claims, 3 Drawing Sheets

FOREIGN PATENT DOCUMENTS

| | | |
|---|---|---|
| EP | 1113666 | 7/2001 |
| EP | 1139212 A2 | 10/2001 |
| EP | 1426962 | 6/2004 |
| WO | WO 02/50829 | 6/2002 |
| WO | WO 2004/049326 | 6/2004 |

* cited by examiner

METHOD AND APPARATUS FOR RECORDING DATA AND RECOVERING RECORDED DATA

This application claims the benefit, under 35 U.S.C. § 119 of European Patent Application 03024291.1, filed Oct. 23, 2003.

FIELD OF THE INVENTION

This invention relates to a method and an apparatus for recording data and recovering data, such that recorded data can be recovered after recording failures. Particularly the method and apparatus are good for recovering recorded MPEG-2 or other streaming data after fatal recording interruptions, such as power failure.

BACKGROUND OF THE INVENTION

The file system of a hard disk or optical disc may lose consistency by an unexpected event during recording, e.g. a power failure, since the file system update is usually done at the end of recording. An interruption especially during the recording of long streams, corresponding to large files, leads to a loss of already recorded streaming data, e.g. video recordings on optical discs like DVDs or Blu-Ray discs.

A proposal to solve the problem of power failure during recording, being disclosed in EP1102275, restores file management information that was destroyed or lost when recording a file. For this purpose, an initial indication of the beginning of a recording is entered in the file allocation table (FAT) of the file management system stored in the system area of a storage medium, and file management information is temporarily stored on a memory during the recording process. When the recording is finished, the file system in the system area of the storage medium is updated by copying the file management information from the memory to the storage medium. For detection of a discontinuous point in the stream, time stamps or program clock reference (PCR) values are detected and compared. However, this method is not adaptable to applications like DVD-VR (Video Recording), HD-DVD or Blu-Ray discs which use neither FATs nor PCRs or comparable time stamps. E.g. DVD-VR uses the Universal Disk Format (UDF) file system defined by the Optical Technology Storage Association (www.OSTA.org), which employs no separate system area on the storage medium, but contains a directory and file structure based on linked lists, i.e. distributed directory and file information.

Also journaling file systems like e.g. the NT File System (NTFS) are able to keep an unambiguous state of the disk. NTFS has features to improve reliability, e.g. transaction logs, to help recover from disk failures. Anyhow, NTFS like other file systems is not aware of the already recorded amount of data during stream recording. If a failure occurs, the whole data stream recording must be repeated. Journaling file systems require a lot of pick-up jumps on the disk, compared to e.g. UDF.

SUMMARY OF THE INVENTION

The invention is based on the recognition of the facts described in the following.

Often the recorded audio and/or video (AV) streams comply with the MPEG-2 standard (Motion Picture Expert Group) defined in ISO/IEC 13818, e.g. ISO/IEC 13818-2 for video. In this case the stream may contain additional sections, which are user definable and are called user data fields. Also other AV stream standards provide such user data fields, e.g. MPEG-4, Windows Media Video (WMV9) or AV Interleaved (AVI). The additional data fields, or user data fields, may be arbitrarily located within the stream, or at fixed known positions. E.g. for an MPEG-2 stream these fields are called user_data( ). Inside the MPEG-2 stream there are different locations possible for user_data( ) fields, e.g. in the sequence_header( ) section, or as last part of the extensions_and_user_data( ) section, just after picture_coding_extension( ), as defined in chapter 6.2.2 "Video Sequence" of ISO/IEC 13818-2. These positions are marked within the stream. At such a mark, a user data field may or may not already exist. If no user data field exists, then user data fields can be inserted, otherwise additional user-data can be inserted to existing user data fields. Usage of these areas has to comply with the MPEG rules, e.g. these fields must not contain any MPEG start code prefix. An MPEG start code prefix consists of three bytes, with the lowest bit being 1 and the other bits being 0. These user fields are usable for purposes not specified by the MPEG-2 standard itself.

The problem to be solved by this invention is to record on a storage medium a data stream that provides positions for insertion of additional data fields and may consist of one or more fragments, such that the recorded data stream can be recovered if the recording process was interrupted improperly before the file system could be updated.

A method to solve this problem is disclosed in claim 1. A method for recovering such data is disclosed in claim 2. An apparatus for recording data accordingly is disclosed in claim 3. An apparatus for recovering data accordingly is disclosed in claim 4.

The invention is usable for all kinds of storage media. It is particularly advantageous for optical discs, i.e. it can also be used for file systems like e.g. UDF that provide no separate system area.

The high pick-up jump rate required by e.g. journaling file systems is a problem for optical discs, since due to the relatively slow moving optical pick-ups much more time for a random access is needed than on magnetic discs. It is an advantage of the inventive method that the pick-up jump rate is lower than known file systems, e.g. NTFS, require.

According to the invention, dedicated file system data may be put into the user data fields of streaming data, e.g. an MPEG-2 stream. These dedicated file system data are called herein "recovery descriptor", and provide the possibility to identify and recover an interrupted stream recording, e.g. due to recording failures or receiver failures.

This method has the advantage that recovery of already recorded streams is always possible, even if a recorded stream is incomplete and the file system was not updated, e.g. after a power failure. Further, the distance between successive user data fields and thus between successive recovery descriptors is usually known, so that these fields may be located very quickly when the recording is scanned through. If the user data fields may be positioned arbitrarily in the recorded stream, the position of each user data field can be chosen so that it is easy to locate from the previous or next user data field, or both, and from the start or the end of the recording, e.g. after a certain number of bytes.

The inventive method is particularly advantageous when a recorded stream is distributed to fragments being stored on more than one section of the storage medium, like allowed by UDF. Thus, also the integrity of a stream may be checked very quickly. At certain times, e.g. at power-up, when a recording is programmed or upon other request, the file system may be checked for data that are unregistered in the file system, and upon detection of such the file system may be updated.

Further advantages provided by the inventive method are that an already recorded data stream, after improper interruption of recording, may be reconstructed and used, and that previous takes of a session e.g. for an optical disc may be restored, and that even the data recorded on write once media can be read after incomplete recording.

Known optical disc recorders update the file system of a disc when the disc is ejected or the recorder is switched off. When in a single session, meaning between medium activation and medium deactivation, e.g. from disc insertion to disc eject or power-off, a first and a second data stream is recorded on the medium, and a power failure occurs during the recording of the second stream before its file system can be updated, then conventional file systems may not recover any recorded data. Write once media are in this case destroyed. With the inventive method the first stream can be recovered completely, and the second stream can be recovered in one embodiment of the invention up to the last recorded recovery descriptor, and in another embodiment of the invention up to the last recorded data unit, e.g. group-of-pictures (GOP) for MPEG.

In principle, an apparatus for recording data streams according to the invention may read or analyze a storage medium in order to find free storage segments to store data, receive an input data stream to be stored, write a fragment of the data stream to a free storage segment, generate a recovery descriptor that contains file system information, and insert at a defined position, e.g. after a defined amount of written data, but at least once within each stream fragment, the recovery descriptor into the data stream fragment to be stored. Further, when the current storage segment is full, the inventive apparatus may continue to store the next fragment of streaming data in another free storage segment and add a reference to this next used storage segment to the recovery descriptor of the previous segment. Optionally it may also add a reference to the previously used storage segment to the recovery descriptor of a particular segment. The apparatus may use any method for determining the next free storage segment to be used, e.g. select the largest free segment. Therefore, such apparatus has means for generating user defined data fields according to the employed stream standard, means for inserting file system information into the user defined data fields, means for inserting at least one user defined data field into each data stream fragment to be stored, and means for writing the data stream including the inserted user data fields to a storage medium. Further, it may comprise means for data input, e.g. data interface or receiver unit.

The means for generating a recovery descriptor may be e.g. a processor that collects the required data and determines the position where to insert the recovery descriptor. The means for inserting the recovery descriptor into the data stream to be stored may be some type of multiplexing unit and may include a buffer for buffering the continuous data stream while the user data fields are inserted. The means for writing the data stream to a storage medium may be any means for such purpose, e.g. laser unit for optical discs.

A storage segment is understood herein as a portion of a storage medium, which portion contains a continuous part or fraction of the data stream. The minimum size of such storage segment, and therefore of a data stream fraction, is usually given by the storage medium format, e.g. 1 KByte or 64 Mbytes. Usually the actual storage segment size is a multiple of the minimum segment size.

In principle, an apparatus for reading data streams utilizing the inventive method may, after e.g. insertion of a removable storage medium, check the sections of the medium indicated by the file system as unused or free, and upon detection of data in such sections search for a recovery descriptor within the data, and upon detection and evaluation, i.e. comparison of a recovery descriptor skip a determined amount of data on the medium to search the next recovery descriptor. Finally it may output a description of the data, e.g. length or title, and prompt the user whether to restore the data stream by file system update or not.

Further, the apparatus may comprise a unit for reproducing the data stream, e.g. audio or video output. The checking of free sections of a storage medium may also be done initially after power-up or upon any request.

A particular advantage of the inventive method is that file management information is stored on the medium at the current location of the pick-up, so that the pick-up is not required to jump when storing or reading this information.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 a data stream with entry points at user data fields.

DETAILED DESCRIPTION OF PREFERRED EMBODIMENTS

Figure 1:
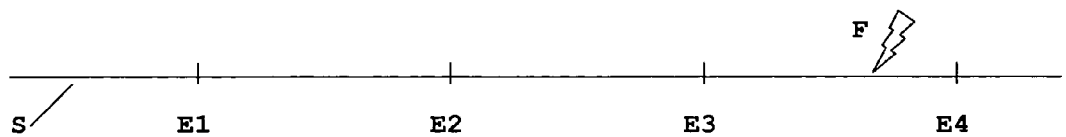

FIG. 1 shows a data stream S being recorded, with the time axis from left to right. The stream S contains equidistant entry points E1, . . . ,E4 being user data fields or indication marks shortly before such fields. "Equidistant" needs not necessarily refer exactly to the amount of bits or bytes, but to a position near such location. If e.g. the distance between successive user data fields E1,E2 should be 10 Mbytes, but at that position E2 is a contiguous data block that should not be cut, then the user data field E2 may also be located before or after that data block. When a failure F, e.g. a power failure, interrupts the recording of this stream S, the data stream is physically stored up to this moment, but there may be no time for a file system update. Therefore, when the failure is remedied, a recording or playback device according to the invention may detect that the file system was not updated. The device checks the entry points of the last recorded stream, and thus detects that the sections up to the last written entry point E3 are correctly stored. Therefore it may update the file system accordingly. If the recording medium is rewritable, recording may even continue after the last valid entry point E3. Recording may also be continued on write-once media, if the file system ignores the segment with the recording interruption, and continues with the next segment.

Figure 2:
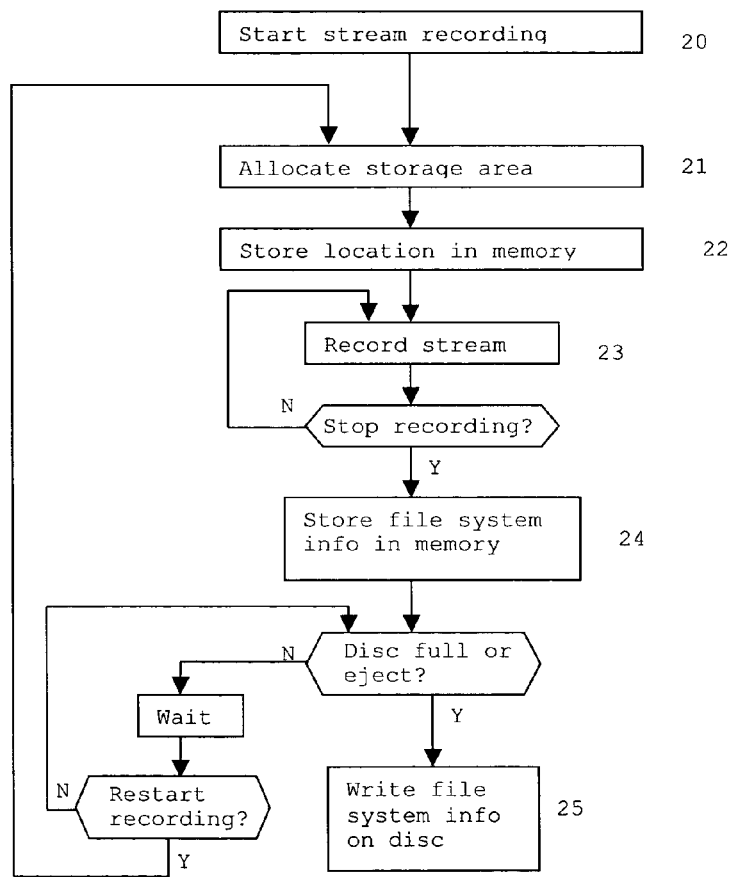
FIG. 2 a flow-chart of an exemplary prior art recording procedure.

Conventionally, the processing when recording a stream on an optical disc may be as shown in FIG. 2 and described in the following:

When recording starts 20, at first storage area is allocated 21, i.e. big enough free areas on the recording medium are searched. In this case 'free' area means an area where data may be recorded. If this area contains data, the data are deleted and thus marked as invalid. The location of these free areas is kept 22 in a memory inside the recording device. Then the actual recording of the stream starts 23, writing stream data to the storage medium, e.g. disk. The currently used storage segment is contained in the information stored in the above-mentioned memory. When a command to stop stream recording is received, the file system information of the medium is updated 25, using the information from the memory. Such command could be e.g. a "stop" or "eject" command from the user, the end of the recorded stream or a "disk is full" signal. If the storage device is e.g. a hard disk and it still has power, the file system information is written immediately to the disk. If it is an optical disc, then the file system information is kept 24 inside the memory until the disc is ejected, and then the complete file system information is written 25 to the disc just before ejection.

The reasons for different handling of hard disks and optical disks are that hard disks provide much faster pick-up jumps for random access than optical discs, and that optical discs allow only a limited number of rewrite cycles for each storage sector, e.g. about 1000 cycles for DVD–RW and DVD+RW. Hard disks have no real rewriting limitations. The above-described process of stream recording shows that an interruption of the recording prevents the update of the file system on the disk. The device may have recorded a lot of useful stream data, but after a failure a conventional device is not able to recover the already recorded data on the medium, because the file system was not updated. A device using the inventive method, as described below, may recognize the recorded stream, or fractions thereof, and update the file system, so that the recorded data may be used. In the case of rewritable media this may prevent a following recording process from automatically overwriting the already recorded stream or stream fraction. Further, write-once discs like DVD–R or DVD+R may be prevented from being handled as destroyed after a recording failure, like known devices would do when detecting that sectors indicated as free on a disc are already used.

It is advantageous if the memory that holds the file system information regarding the currently recorded stream is able to hold its information without power, like e.g. a flash memory, because then it is easier for the recording device to recover its state after a power failure, and detect which storage segments were used. Then the file system may be updated after power returned.

According to the invention, relevant file system data are stored inside the file, e.g. MPEG stream. Therefore a recording device is able to detect after returning from e.g. a power failure, that sectors indicated as unused on the medium contain recorded data, e.g. an MPEG stream, if the MPEG stream contains special file system data, which enables the device to reconstruct the last recording process. That is, the device gets the necessary information to save the already recorded data correctly as MPEG stream file, according to the used file system. A playback device may use the same method to reproduce incompletely recorded discs.

Advantageously, the relevant file system information is stored several times in reasonable intervals within the stream. These are preferably data intervals, e.g. every 64 Mbytes of data, with small variations due to the data structure. For the MPEG embodiment of the invention the file system information may be inserted e.g. just after the group_of_picture_header( ) inside the user_data( ) of extension_and_user_data( ), described in chapter 6.2.2.2 of ISO/IEC13818-2. Therefore the information necessary for reconstruction of a file is available very early, considering that the recording may have been running for hours.

The file system information to be stored may comprise the following information:
- an identifier to recognize that the following data are file recovery information,
- recording date and time,
- file name and its path,
- indicator for assigned application type, e.g. DVD-VR,
- optionally special additional application information necessary to complete the related application information, e.g. IFO files for DVD-VR,
- pointers to the previous fragment belonging to this stream, e.g. start and end address,
- start and optionally latest possible end address of the stream recording fragment on the disc, wherein the actual recording may end in between these marks, e.g. by user interaction, stream end or power failure,
- location of the next stream recording fragment, in order to find the following parts of the whole recorded stream if any, since at recording start time it is not known whether the recording will need this additional fragment or the recording ends in the current fragment, so that this location indicator for the next fragment may point to an unused fragment,
- optionally an identifier to get secondary information to recognize which fragments belong together, e.g. a list of fragments initially planned to be used for the recording,
- optionally an index of the current fragment in the sequence of fragments the stream consists of, e.g. 0 indicates the first fragment of the stream and 1 the second fragment of the stream.

An exemplary recovery descriptor within a user-defined field according to the above-mentioned MPEG-2 standard is listed in Tab. 1.

TABLE 1

| L | Size | Description | Content | Format |
|---|------|-------------|---------|--------|
| 1 | 32 | Start code prefix and user_data_start_code | 4 bytes: 00, 00, 01, B2$_{hex}$ | Unsigned bytes |
| 2 | 256 | Identifier for file recovery information | "FILERECOVERYINFO" | ASCII |
| 3 | 8 | Version of this descriptor | 1 | Unsigned bytes |
| 4 | 16 | fl = length (bytes) of file name incl. path name and directory separators | 16 bit unsigned int. value, must be > 0, file system compliant | Big endian unsigned integer |
| 5 | fl*8 | File name incl. full path | ASCII character | Characters |

TABLE 1-continued

| L | Size | Description | Content | Format |
|---|---|---|---|---|
| | | name and "/" as directory separator, no Null bytes | string (only valid ASCII characters) | |
| 6 | 24 | Recording start date (YYMMDD) of the stream | Year, month and day, all > 0. | Unsigned byte (3x) |
| 7 | 16 | Recording start time of the stream | Hour and minute | Unsigned byte (2x) |
| 8 | 2 | Marker Bits | Both set to 1 | Two bits |
| 9 | 6 | Recording start time of the stream | Second (0 . . . 59) | Unsigned byte |
| 10 | 48 | Application Identifier (e.g. "DVD-VR"), unused characters are spaces | ASCII character string, no spaces within the string | 6 characters |
| 11 | 1 | Marker Bit | 1 | Bit |
| 12 | 15 | na: number of following bytes for the specified application. na may be 0. | 15 bit unsigned integer value | Big endian unsigned integer |
| 13 | na*8 | Information for the application. | MPEG start codes are prohibited. | |
| 14 | 1 | Marker Bit | 1 | Bit |
| 15 | 15 | Upper 15 bits (15 . . . 29) of the LBA of the start of the previous stream fragment of this stream. | 15 bit unsigned integer value. | Big endian unsigned integer |
| 16 | 1 | Marker Bit | 1 | Bit |
| 17 | 15 | Lower 15 bits (0 . . . 14) of the LBA of the start of the previous stream fragment of this stream | 15 bit unsigned integer value. | Big endian unsigned integer |
| 18 | 1 | Marker Bit | 1 | Bit |
| 19 | 15 | Upper 15 bits (15 . . . 29) of the LBA of the end of the previous stream fragment of this stream. | 15 bit unsigned integer value. | Big endian unsigned integer |
| 20 | 1 | Marker Bit | 1 | Bit |
| 21 | 15 | Lower 15 bits (0 . . . 14) of the LBA of the end of the previous stream fragment of this stream. | 15 bit unsigned integer value. | Big endian unsigned integer |
| 22 | 1 | Marker Bit | 1 | Bit |
| 23 | 15 | Upper 15 bits (15 . . . 29) of the LBA of the start of this stream fragment | 15 bit unsigned integer value. | Big endian unsigned integer |
| 24 | 1 | Marker Bit | 1 | Bit |
| 25 | 15 | Lower 15 bits (0 . . . 14) of the LBA of the start of this stream fragment. | 15 bit unsigned integer value. | Big endian unsigned integer |
| 26 | 1 | Marker Bit | 1 | Bit |
| 27 | 15 | Upper 15 bits (15 . . . 29) of the LBA of the maximum possible end of this stream fragment. | 15 bit unsigned integer value. | Big endian unsigned integer |
| 28 | 1 | Marker Bit | 1 | Bit |
| 29 | 15 | Lower 15 bits (0 . . . 14) of the LBA of the maximum possible end of this stream fragment. | 15 bit unsigned integer value. | Big endian unsigned integer |
| 30 | 1 | Marker Bit | 1 | Bit |
| 31 | 15 | Upper 15 bits (15 . . . 29) of the LBA of the start of the next possible stream fragment. | 15 bit unsigned integer value. | Big endian unsigned integer |
| 32 | 1 | Marker Bit | 1 | Bit |
| 33 | 15 | Lower 15 bits (0 . . . 14) of the LBA of the start of the next possible stream fragment. | 15 bit unsigned integer value. | Big endian unsigned integer |
| 34 | 1 | Marker Bit | 1 | Bit |
| 35 | 23 | Identifier of this stream | 23 bit unsigned integer value. Must be > 0. | Big endian unsigned integer |
| 36 | 1 | Marker Bit | 1 | Bit |
| 37 | 14 | Fragment counter. First is 0 | 14 bit unsigned integer value | Big endian unsigned integer |
| 38 | 1 | Marker Bit | 1 | Bit |

The recovery descriptor within a user-defined field according to the MPEG-2 standard shown in Tab. 1 begins with a start sequence, consisting of start_code_prefix and user_data_start_code. The actual user_data starts after the start sequence. Since the start_code_prefix must be a unique pattern, there are a number of marker bits inserted in the user_data in order to avoid undesired repetition of forbidden code words, e.g. MPEG start codes. The start_code_prefix is $000001_{hex}$ and the user_data_start_code is $B2_{hex}$, as defined for MPEG-2.

The next fields contain an identifier for the purpose of the user-data field, namely file recovery information, descriptor version indication, the file name including full path information and directory separators and its length, recording start date and time, an application identifier used to find an application that may utilize the data, and additional information for the application. Further fields contain the logical block addresses (LBA) of start and end of the previous stream fragment if any, start and possible end of the current stream fragment and start of the next possible stream fragment. Since these values are arbitrary, marker bits are inserted to prevent appearance of the MPEG start_code_prefix. Then, there is an identifier for the current data stream and a fragment counter. If the fragment counter is e.g. 0, indicating that this is the first fragment, the above-mentioned LBAs of previous stream fragment can be ignored.

Recording Procedure Example

Figure 3:
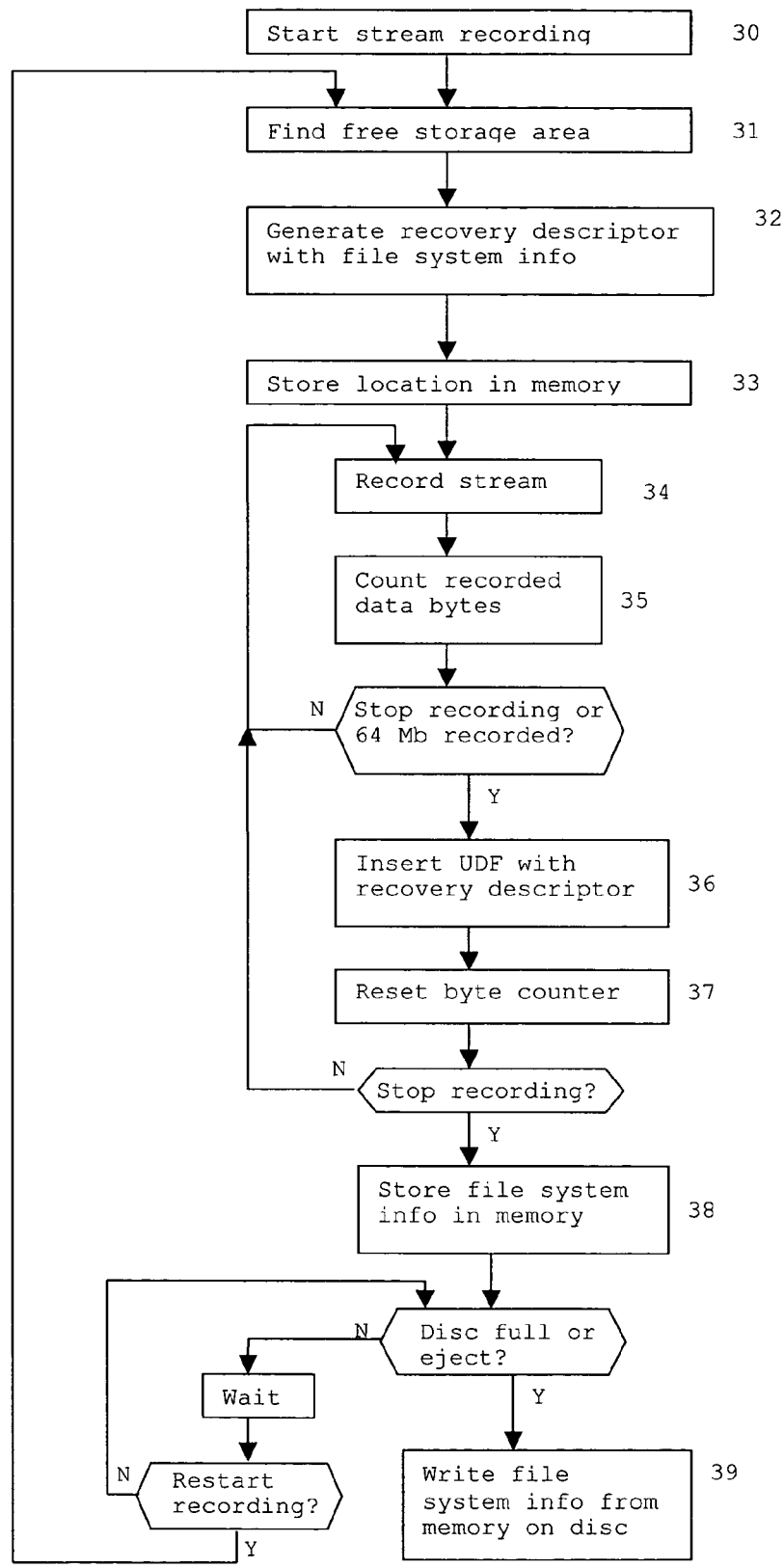
FIG. 3 a flow-chart of an exemplary recording procedure.

A recording procedure according to the invention may be as shown in FIG. 3 and described in the following.

After a "start recording" event 30 the recording device detects 31 the location of the next appropriate and free data storage fragment for the stream recording. It may also be advantageous already at this stage to get the location of the next free fragment for the stream recording, which can be used if the current fragment is completely full, so that the next appropriate and free data storage fragment for the stream recording is already known. Then a recovery descriptor like e.g. described above is prepared 32 and stored 33, e.g. in a memory, and the recording of the stream may start 34. Exemplarily it is assumed to record a video sequence with a structure as shown in Tab. 2.

TABLE 2

```
Video_sequence( ) {
    next_start_code( )
    sequence_header( )
    if (nextbits == extension_start_code) {
        sequence_extension( )
        do {
            extension_and_user_data(0)
            do {
                if (nextbits( ) ==group_start_code) {
                    group_of_pictures_header( )
                    extension_and_user_data(1)
                }
                picture_header( )
                picture_coding_extension( )
                extension_and_user_data(2)
                picture_data( )
            } while (nextbits( ) == picture_start_code)
            if (nextbits( ) != sequence_end_code) {
                Sequence_header( )
                Sequence_extension( )
            }
        } while (nextbits( ) != sequence_end_code)
    }
}
extension_and_user_data (i) {
    while ((nextbits( ) ==extension_start_code) ||
           (nextbits( ) ==user_data_start_code)) {
```

TABLE 2-continued

```
        if ((i!=0)&&(nextbits( ) ==extension_start_code))
            extension_data(i)
        if (nextbits( ) ==user_data_start_code)
            user_data( )
    }
}
```

The shown video sequence is extended, after next_start_code and sequence_header, with extension_and_user_data (0) and a block that contains inter alia extension_and_user_data(1) and extension_and_user_data(2). The recovery descriptor is inserted as user_data( ) into the extension_and_user_data(1) section following after the group_of_pictures_header. If the user_data( ) contains already other data, then this user_data( ) section may be extended by appending the recovery descriptor at the end of the user_data( ) section.

Video data are recorded in the picture_data( ) section. The recorded data are counted 35, e.g. the number of bytes, and after a specified amount of recorded stream bytes, e.g. 64 Mbytes, a user_data( ) field containing the prepared recovery descriptor is inserted 36 at the next occurring kind of user_data( ), e.g. in the extension_and_user_data(1) section as a part of a group of pictures (GOP), or in the extension_and_user_data(2) section just before the next picture_data( ). Then the data counter is reset 37, and if recording continues, writing of this recovery descriptor into the stream is repeated after another 64 Mbytes, using another user data field. A final user data field is inserted 36 if recording is stopped. In this case the file system information is also stored in a memory 38, and upon ejection of the disc the file system is updated 39 just like in conventional systems. An advantage of this method of having a specified amount of data between successive recovery descriptors is that the recovery descriptors may later easily be found.

If the recording stops properly, e.g. by the user pressing a "stop" button, then a recovery descriptor as described before is prepared in a RAM, and the end of the stream is conventionally stored. This is possible because the end of the recording is known. The stream end location will probably be before the end of the currently used storage area block. The pointer to the next fragment needs not be used for the last fragment. Such unused fields may be set to 0. The prepared recovery descriptor may be stored as user_data( ) in the last extension_and_user_data(2) section, just before the last picture_data( ) of that stream, in the same manner as described before.

If the currently used fragment runs full during recording, e.g. 20 Mbytes after the previous recovery descriptor, then storage may continue at the next fragment with the missing data, e.g. 44 Mbytes, before the next recovery descriptor, and a pointer to the next fragment is stored at least in the last descriptor of the current fragment. Additionally it may also be advantageous to store a pointer to the next fragment in the first or in all descriptors of a fragment. This has the advantage of providing easier navigation between the fragments of the file. Storage continues as described above, with incrementing the fragment counter for each fragment.

If a power failure occurs, the recording stops immediately. Thus, the device is not able to store 36 a recovery descriptor in the recorded stream. In this case the recording may be recovered and continued later using the recovering procedure described in the following, if the medium is rewritable. If it is a write-once medium, the recorded stream at least up to the last recorded descriptor may later be retrieved. An advanced type of player may also retrieve data up to the last recorded data unit, e.g. the last group-of-pictures (GOP) for MPEG streams.

Recovering Procedure Example

Figure 4:
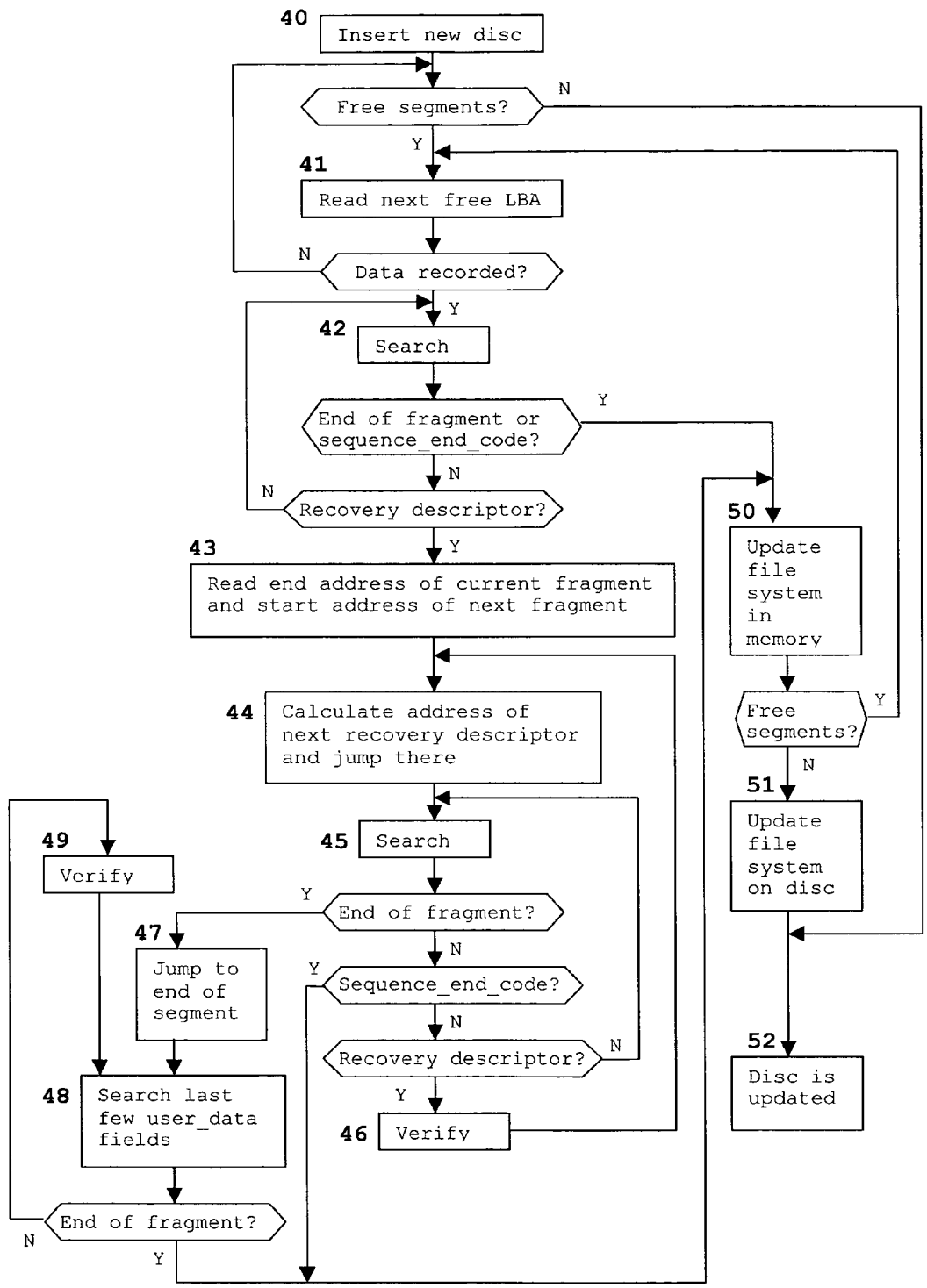
FIG. 4 a flow-chart of an exemplary recovering procedure.

If a power failure occurs before the device has stored all the necessary file system information onto the disc, then the device according to the invention can retrieve the data by using a special power-up procedure, as shown in FIG. 4 and described in the following.

Whenever a new disc is inserted 40, the device may check first whether the last recording operation on this disc was finished successfully and completely. If the memory that holds file system information during the recording is non-volatile, this may be performed by reading the memory. It may also be performed by searching and reading 41 the next disc sector address or logical block address (LBA), which is indicated by the file system as being free. Particularly the start of the bigger fragments may be checked first, because this is where new recordings would start. In one embodiment of the invention only the few biggest free disc sectors are checked. If the checked sectors contain no data, then the disc is assumed to be updated 52. If the device recognizes that such free sectors already contain recorded data, then it is probable that recording on this disc was not completely finished. In this case the device searches 42 for recovery descriptors in these unregistered sectors. This may be done by searching for the recovery descriptor identifier, e.g. "FILERECOVERYINFO" in Tab. 1, or by searching for a certain stream type, e.g. an MPEG stream, and parsing for recovery descriptors within the appropriate user data sections of the stream.

In one embodiment of the invention, the device, which may be a recording and/or playback device, checks the recovery descriptors of some or all partitions of data streams that it finds on a storage medium, always when the medium was changed, e.g. a new disc inserted, or at power-up. In another embodiment this check is performed upon request. If the device detects a recovery descriptor, then it first evaluates the fields containing the end address of the current fragment and the start address of the next fragment 43. Then the address where the next recovery descriptor can be expected is calculated 44, e.g. by adding a fixed value to the current address, and the pick-up may jump 44 to the calculated position as described above in the recording procedure.

In one embodiment of the invention a recovery descriptor was inserted at exactly that position, while in another embodiment a recovery descriptor was inserted on the next suitable position. In the latter case, the next recovery descriptor is searched 45 starting from the jump position.

If a recovery descriptor is found, then it is verified 46 whether the descriptor belongs to the same stream and stream fragment. If the stream data belongs to the same fragment, then the device continues searching in the next fragment, as indicated by the recovery descriptor. It may additionally check the fragment counter in the next recovery descriptor, which must be incremented by 1. If the fragment ends before the next pick-up jump destination, the pick-up jumps 47 to the end of the fragment and searches 48 for a recovery descriptor in the last extensions_and_user_data(2) section before the last three picture_data( ) fields. If a recovery descriptor is found, it is verified 49 in the same manner as previously described.

If the found recovery descriptor does not belong to the current stream, then the stream recording was stopped in between the current pick-up position and the previous pick-up position, just before the last jump. In this case this segment may be searched sequentially for the end of the stream recording. For MPEG, this may happen by parsing for a sequence_end_code.

If a stream ends spontaneously without any end-of-stream mark, then its recording was probably interrupted, e.g. by a power failure. In this case the already recorded stream part can still be used, either by declaring it as a complete stream or by appending the missing end of the stream in another recording operation. In the first case the device may complete the file system data with the file name and additional application information, if any exists, so that the stream is recovered. Further, the user may edit the interrupted stream to get a smoother end of the stream, if desired.

If a stream is recovered, then the recovering procedure may continue searching 41, in order to find other unrecognized streams.

The above-described procedure may result in multiple file system updates. These updates may advantageously be performed 50 in a memory, and only when all storage segments in question are checked, the actual file system on the disc is updated 51. Alternatively, it is also possible to terminate the process after recovering one stream, so that temporary storage of file system data in a memory 50 is not required, but the disc is immediately updated 51.

In one embodiment, also other additional data may be stored inside a recovery descriptor. These may be data to log other file operations, like deleting of a file or changing directory names and so on. If directory name changes are logged, then the directory names used in the path as described in Tab. 2 may comply with the new directory names. Only with such additional information the device will be able to reproduce the correct path for recovering the stream.

The inventive method is applicable to any existing and planned stream recording, especially for any kind of optical recording, like on CD, DVD, Blu-ray and HD-DVD9 discs or their successors.

What is claimed, is:

1. A method for recording an encoded data stream on a storage medium, said method comprising steps of:
    determining a position in said encoded data stream where an additional data field according to an encoding format of said encoded data stream exists or may be inserted, said encoding format providing positions for insertion of additional data fields and said positions being independent from said storage medium;
    if an additional data field exists at said determined position, modifying said existing additional data field, and otherwise inserting an additional data field into said encoded data stream at said determined position;
    inserting file system information into one of said modified and inserted additional data field; and
    recording said encoded data stream including said inserted file system information on said storage medium.

2. The method of claim 1, further comprising a step of determining a storage medium to be used for said recording after said inserting step.

3. The method of claim 1, further comprising a step of formatting said encoded data stream according to said storage medium after said inserting step.

4. The method of claim 1, wherein said file system information is collected in a non-volatile memory during said recording.

5. The method of claim 1, wherein said encoded data stream comprises one or more fragments defined by said encoding format, and said file system information inserted in said additional data field of a particular fragment of said encoded data stream comprises at least one of:
an identifier indicating a data type;
a file name;
a date and time of said recording;
an application type indicator;
a pointer to a beginning of a current fragment of said encoded data stream; and
a pointer to a next fragment of said encoded data stream, if said next fragment exists.

6. The method of claim 1, wherein said encoded data stream comprises one or more fragments defined by said encoding format, and said file system information inserted in said additional data field of a particular portion of said encoded data stream further comprises at least one of:
application information;
a version indication;
a path name and directory separators;
a pointer to a previous fragment of said encoded data stream, if said previous fragment exists;
an identifier for secondary information regarding which fragments belong together;
a fragment counting index; and
an indication for a first or last fragment, or both, of said encoded data stream.

7. The method of claim 1, wherein an amount of data recorded between successive additional data fields is constant, with maximum deviations of a contiguous data block according to said encoding format.

8. The method of claim 1, wherein marker bits are inserted in said file system information recorded in said additional data field to avoid forbidden code words.

9. The method of claim 1, wherein said storage medium is an optical storage medium.

10. The method of claim 1, wherein said encoded data stream complies with at least one of the MPEG-2, MPEG-4, WMV-9 and AVI standards, and said additional data fields are user_fields.

11. A method for reading encoded data from a storage medium, said method comprising steps of:
reading an area of said storage medium that is indicated by a file system as free, said storage medium storing said encoded data having an encoding format that provides positions for insertion of additional data fields and said positions being independent from said storage medium;
detecting that encoded data was read from said storage medium;
detecting a position of one of said additional data fields within said encoded data;
extracting data from said detected additional data field;
determining that said extracted data contains file system information; and
updating said file system according to said file system information.

12. The method of claim 11, wherein said encoded data comprises one or more fragments, and wherein said file system information contained in said detected additional data field of a particular fragment of said encoded data comprises at least one of:
an identifier indicating a data type;
a file name;
a date and time of recording;
an application type indicator;
a pointer to a beginning of a current fragment of said encoded data; and
a pointer to a next fragment of said encoded data, if said next fragment exists.

13. The method of claim 11, wherein said encoded data comprises one or more fragments, and wherein said file system information contained in said detected additional data field of a particular portion of said encoded data comprises at least one of:
additional application information;
an indication of a descriptor version;
a path name and directory separators;
a pointer to a previous fragment of said encoded data, if said previous fragment exists;
an identifier for secondary information regarding which fragments belong together;
a fragment counting index; and
an indication for a first or last fragment, or both, of said encoded data.

14. The method of claim 11, wherein an amount of said encoded data stored between successive additional data fields is constant, with maximum deviations of a contiguous data block according to said encoding format.

15. The method of claim 11, wherein marker bits are inserted in said file system information to avoid forbidden code words.

16. The method of claim 11, wherein said encoded data complies with at least one of the MPEG-2, MPEG-4, WMV-9 and AVI standards, and said additional data fields are user_fields.

17. An apparatus for recording an encoded data stream on a storage medium, said apparatus comprising:
means for determining a position in said encoded data stream where an additional data field according to an encoding format of said encoded data stream exists or may be inserted, said encoding format providing positions for insertion of additional data fields and said positions being independent from said storage medium;
means for modifying an existing said additional data field if said existing additional data field exists at said determined position;
means for inserting an additional data field into said encoded data stream at said determined position;
means for inserting file system information into one of said modified and inserted additional data fields; and
means for recording said encoded data stream including said inserted file system information on said storage medium.

18. The apparatus of claim 17, further comprising means for determining a storage medium to be used for said recording after inserting said file system information.

19. The apparatus of claim 17, further comprising means for formatting said encoded data stream with said inserted file system information according to said storage medium.

20. The apparatus of claim 17, wherein said file system information is collected in a non-volatile memory during said recording.

21. The apparatus of claim 17, wherein said encoded data stream comprises one or more fragments defined by said encoding format, and said file system information inserted in said additional data field of a particular fragment of said encoded data stream comprises at least one of:
an identifier indicating a data type;
a file name;
a date and time of recording;
an application type indicator;
a pointer to a beginning of a current fragment of said encoded data stream; and a pointer to a next fragment of said encoded data stream, if said next fragment exists.

22. The apparatus of claim 17, wherein said encoded data stream comprises one or more fragments defined by said encoding format, and said file system information inserted in said additional data field of a particular portion of said encoded data stream further comprises at least one of:
   additional application information;
   a version indication;
   a path name and directory separators;
   a pointer to a previous fragment of said encoded data stream, if said previous fragment exists;
   an identifier for secondary information regarding which fragments belong together;
   a fragment counting index; and
   an indication for a first or last fragment, or both, of said encoded data stream.

23. The apparatus of claim 17, wherein an amount of data recorded between successive additional data fields is constant, with maximum deviations of a contiguous data block according to said encoding format.

24. The apparatus of claim 17, wherein marker bits are inserted in said file system information recorded in said additional data field to avoid forbidden code words.

25. The apparatus of claim 17, wherein said encoded data stream complies with at least one of the MPEG-2, MPEG-4, WMV-9 and AVI standards, and said additional data fields are user_fields.

26. An apparatus for reading encoded data from a storage medium, said apparatus comprising:
   means for reading an area of said storage medium that is indicated by a file system as free, said storage medium storing said encoded data having an encoding format that provides positions for insertion of additional data fields and said positions being independent from said storage medium;
   means for detecting that encoded data was read from said storage medium;
   means for detecting a position of one of said additional data fields within said encoded data;
   means for extracting data from said detected additional data field;
   means for determining that said extracted data contains file system information; and
   means for updating said file system according to said file system information.

27. The apparatus of claim 26, wherein said encoded data comprises one or more fragments, and wherein said file system information contained in said detected additional data field comprises at least one of:
   an identifier indicating a data type;
   a file name;
   a date and time of recording;
   an application type indicator;
   a pointer to a beginning of a current fragment of said encoded data; and
   a pointer to a next fragment of said encoded data, if said next fragment exists.

28. The apparatus of claim 26, wherein said encoded data comprises one or more fragments, and wherein said file system information contained in said detected additional data field comprises at least one of:
   application information;
   a version indication;
   a path name and directory separators;
   a pointer to a previous fragment of said encoded data, if said previous fragment exists;
   an identifier for secondary information regarding which fragments belong together;
   a fragment counting index; and
   an indication for a first or last fragment, or both, of said encoded data.

29. The apparatus of claim 26, wherein an amount of data stored between successive additional data fields is constant, with maximum deviations of a contiguous data block according to said encoding format.

30. The apparatus of claim 26, wherein marker bits are inserted in said file system information to avoid forbidden code words.

31. The apparatus of claim 26, wherein said encoded data complies with at least one of the MPEG-2, MPEG-4, WMV-9 and AVI standards, and said additional data fields are user_fields.

* * * * *